April 14, 1936. M. THORPE 2,037,288
MILK CAN INDICATOR
Filed Feb. 12, 1935 2 Sheets-Sheet 1
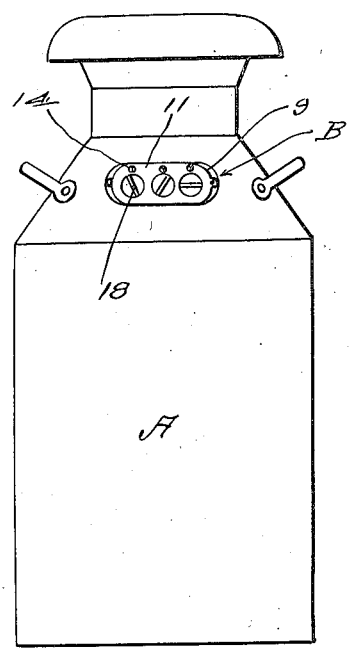
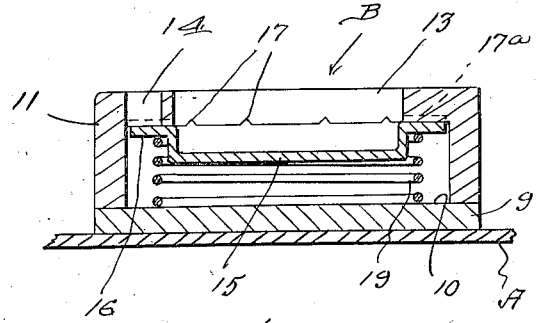
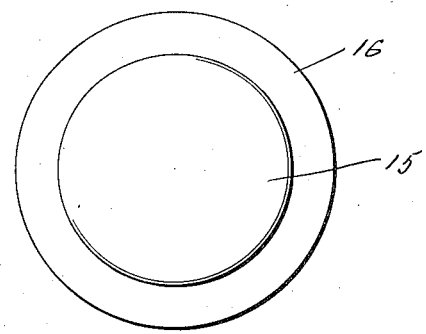
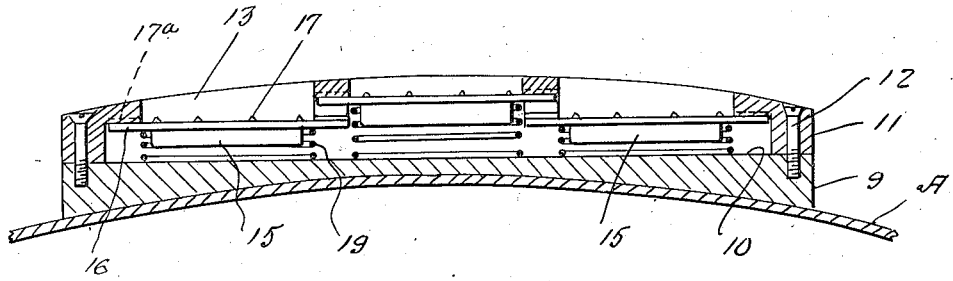
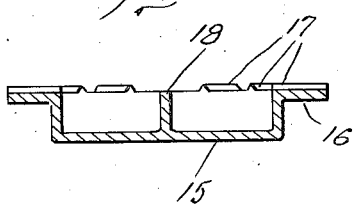
Inventor
M. Thorpe
By Clarence A. O'Brien
Attorney April 14, 1936.  M. THORPE  2,037,288
MILK CAN INDICATOR
Filed Feb. 12, 1935   2 Sheets-Sheet 2
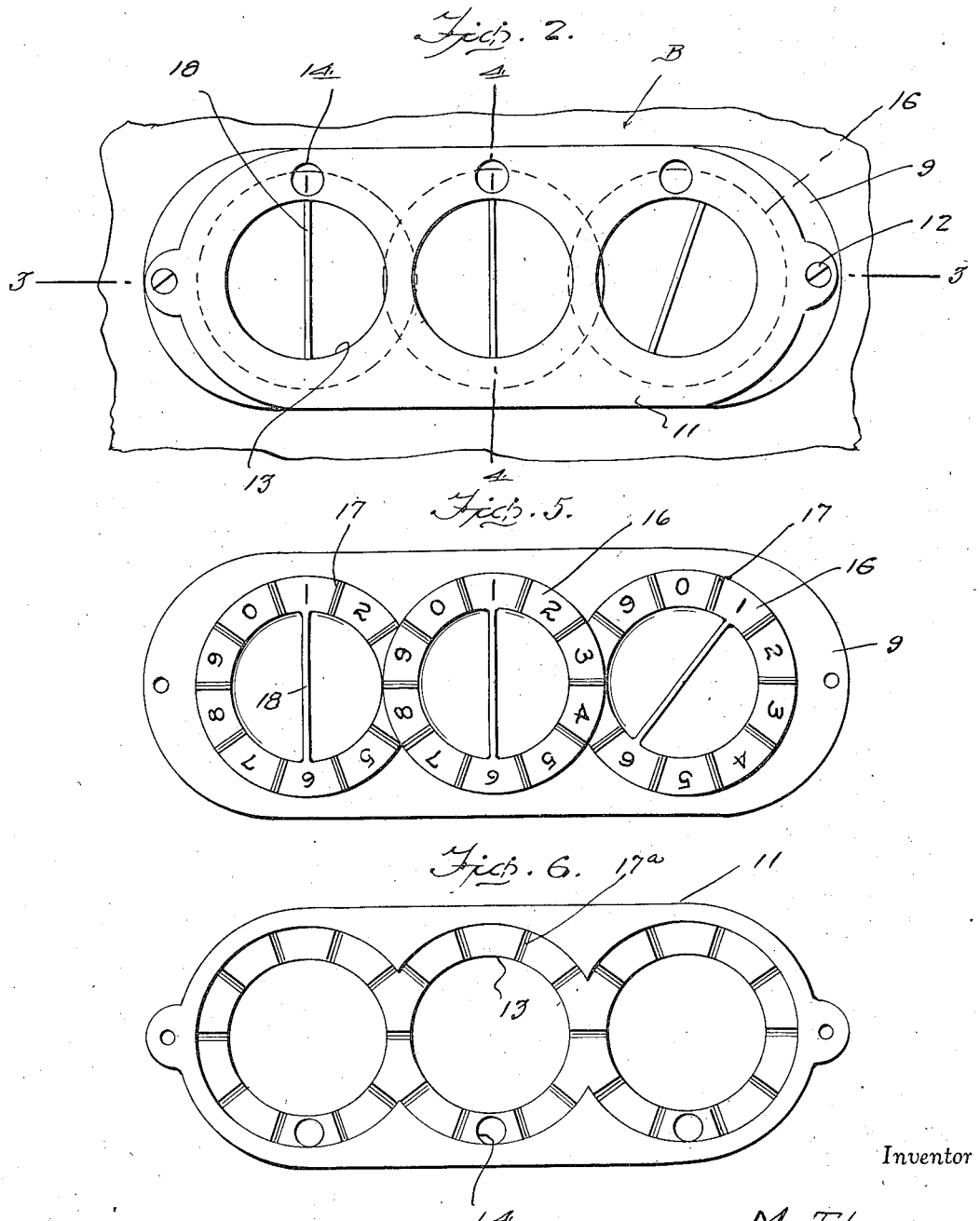
Inventor
M. Thorpe
By Clarence A O'Brien
Attorney Patented Apr. 14, 1936

2,037,288

UNITED STATES PATENT OFFICE 2,037,288

MILK CAN INDICATOR

Milford Thorpe, McKinley, Wis.

Application February 12, 1935, Serial No. 6,266

5 Claims. (Cl. 40—70)

This invention relates to a novel calibrated or graduated indicator attachment for conventional milk cans of the larger type such as are used by dairymen and milk haulers, and its purpose is to permit the indicator to be accurately set to satisfactorily denote the quantity of the contents of the can to facilitate business-like handling by the wholesaler or other recipient of the goods.

Although it might be possible to employ a single dial equipped structure, I have found it expedient and practicable to resort to the use of a multiple dial assembly wherein the dials are incorporated in novel means satisfactorily attachable to the regular delivery can without requiring alterations, whereby to provide a reliable and dependable visible indicator for the purposes stated.

My primary aim is to provide a simple and economical attachment which is not likely to be damaged or to get out of order and which may be readily adjusted by those handling the merchandise thereby providing a unique quantity measuring and indicating device for those engaged in the milk business.

Other features and advantages of the invention will become more readily apparent from the following description and accompanying pictorial drawings.

In the drawings:

Figure 1 is an elevational view showing a large size milk can of a conventional type equipped with a dial indicator constructed in accordance with this invention.

Figure 2 is an enlarged face view showing how the numerals on the correlated dials function to indicate the weight contents of the can.

Figure 3 is a longitudinal sectional view taken on the plane of the line 3—3 of Figure 2.

Figure 4 is a section at right angles on the line 4—4 of Figure 2.

Figure 5 is a view with the cover removed to show the relative association or overlapping relation of the turnable dials.

Figure 6 is a view looking at the inside or bottom of the recessed cover of the assembly.

Figure 7 is a detail view of one of the cup-shaped dials.

Figure 8 is a section through said dial.

In the drawings in Figure 1, the conventional portable milk can is denoted by the letter A and the attachment or indicator is represented as a unit by the letter B. It is the attachment which constitutes the novelty of the invention. Therefore, it is naturally adapted in shape and proportion to fit on the tapered upper part or neck portion of the can, this being the most suitable place for its convenient handling and reading. The casing part of the indicator is made up of two complemental parts or sections. The numeral 9 designates what may be designated as the base plate and this has a flat outer surface 10 and a curved inner surface which fits against and is suitably secured to the can. The cover unit or section 11 is detachably mounted on the base and held in place by end screws or the like 12. The cover is provided with a series of three circular openings 13 which permit access to be had to the dials for convenient operating purposes. In addition, it is provided with a row of sight holes 14 through which the numbers on the dials may be conveniently read. Looking at the under or inside face of the cover as seen in Figure 6, it will be observed that it is formed of complemental recesses of a circular design which serve to accommodate the dials. There are three dials and each one includes a cup portion 15 having a marginal annular flange 16. The flange is provided with radial circumferentially spaced V-shaped lugs which function as ratchet teeth 17. These teeth cooperate with complemental stationary teeth 17a on the cover. In the cup is a centrally located rib 18 which functions as a finger piece and which facilitates the turning of the dial. This finger piece or rib is located within the depth of the cup itself so as to avoid the presence of projections such as might be accidentally struck and turned during the rough handling to which the can is generally subjected in transportation, etc. Associated with the cup portion of each dial is a coil spring 19 which surrounds the cup and bears against the flat surface 10. It also bears against the flange and keeps the teeth 17 on the flange in locking engagement with the stationary teeth 17a. It is evident therefore, that in order to adjust the dial it is necessary to insert the fingers through the hand opening 13 and to press down on the dial against the tension of the spring. By placing two fingers in the cup and grasping the rib 18 it can be conveniently handled for turning or adjusting the dial to bring the requisite numbers or other legends on the dial into registry with the sight openings 14. It will be noted that the two outer dials are disposed in a plane even with each other while the overlapping central dial is disposed in a plane slightly outwardly of said two end dials. This arrangement provides for compactness and simplification in construction and provides also the requisite clearance for movement or independent adjustment of the central dial. The three dials together, bearing numbers from one to ten may be adjusted to indicate a waste content in the can up to 999 pounds.

The gist of the invention is in the provision of a suitable casing for atachment to a conventional milk can at an appropriate or convenient place. Said casing being constructed to accommodate the spring pressed rotary dial and having stationary ratchet teeth with which the complemental ratchet teeth on said dial cooperate. It is believed therefore, that novelty exists in this broadly and specifically pointed out in the succeeding claims.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described the invention, what is claimed as new is:

1. An indicator attachment of the class described comprising a base plate, a cover detachably connectible therewith, said cover being provided with a circular hand hole, a sight opening adjacent said hand hole, and on its interior with an annular stationary toothed rack, a spring pressed dial mounted in the base plate between the base plate and cover, having graduations registerable with the sight opening and turnable ratchet teeth cooperable with the rack teeth.

2. An indicator attachment of the class described comprising a base plate, a cover detachably connectible therewith, said cover being provided with a circular hand hole, a sight opening adjacent said hand hole and on its interior with an annular stationary toothed rack, a spring pressed dial mounted in the base plate between the base plate and cover having graduations registerable with the sight opening and turnable ratchet teeth cooperable with the rack teeth, said dial being in the form of a cup having an annular flange carrying the ratchet teeth, and said cup having a finger grip located therein.

3. As an article of manufacture, a component dial for use in an indicator of the class described comprising a cup of a predetermined depth having an annular marginal flange, said flange being graduated and provided with circumferentially spaced radially disposed ratchet teeth, and said cup being formed centrally with an integral rib constituting a finger grip, said rib terminating in a plane substantially flush with the toothed surface of said flange.

4. An indicator for milk cans comprising a base plate shaped for attachment to a predetermined portion of the can, said base plate having a flat outer surface, a cover detachably connected to said flat outer surface, said cover being formed on its interior with a plurality of individual circular recesses and having stationary annular racks, said cover plate being also provided with hand holes and sight openings, and a plurality of spring pressed dials interposed between the flat surface of the base and complemental surface of the cover, each dial being of cupped form, having a finger grip and ratchet teeth cooperable with the adjacent or companion rack, the graduations on the dial being registerable with the coordinated sight openings.

5. An indicator attachment of the class described comprising a casing having formed therein a circular hand hole and a sight opening adjacent said hand hole and on its interior with an annular stationary toothed rack, a spring pressed dial mounted in the casing and having graduations registerable with the sight opening and turnable ratchet teeth cooperable with the rack teeth.

MILFORD THORPE.